United States Patent [19]

Furukawa et al.

[11] 3,886,127
[45] May 27, 1975

[54] ALKALI METALATED ACETYLENE-CONJUGATED DIENE RANDOM COPOLYMER

[75] Inventors: Junji Furukawa, Kyoto; Eiichi Kobayashi; Takahiro Kawagoe, both of Uji, all of Japan

[73] Assignee: Bridgestone Tire Company Limited, Tokyo, Japan

[22] Filed: Sept. 9, 1974

[21] Appl. No.: 504,036

[30] Foreign Application Priority Data

Sept. 12, 1973  Japan............................ 48-102231

[52] U.S. Cl. ............... 260/82.1; 260/94.1; 260/879
[51] Int. Cl. ........ C08d 3/04; C08d 3/06; C08d 3/10
[58] Field of Search ....... 260/94.1, 82.1; 450/371.7, 450/371.8, 610.5

[56] References Cited
UNITED STATES PATENTS

| | | |
|---|---|---|
| 3,062,856 | 11/1962 | D'Alelio.......................... 260/94.1 X |
| 3,097,195 | 7/1963 | Kennerly et al. .................. 260/94.1 |
| 3,492,369 | 1/1970 | Wayler................................ 260/879 |
| 3,515,710 | 6/1970 | D'Alelio........................ 260/94.1 X |

Primary Examiner—William F. Hamrock
Attorney, Agent, or Firm—Stevens, Davis, Miller & Mosher

[57] ABSTRACT

An alkali metalated acetylene-conjugated diene random copolymer obtained by reacting an acetylene-conjugated diene random copolymer having an acetylene unit content of 5–60 mol% and a block character P of 0.8–1.2 with an alkali metal or an organo alkali metal compound. The alkali metalated copolymer can be used as a starting material of functional polymers, graft polymers with vinyl monomers and monomer addition products, which are useful raw materials for the production of coating compositions, adhesives, reactive softeners and other industrial materials.

10 Claims, 1 Drawing Figure

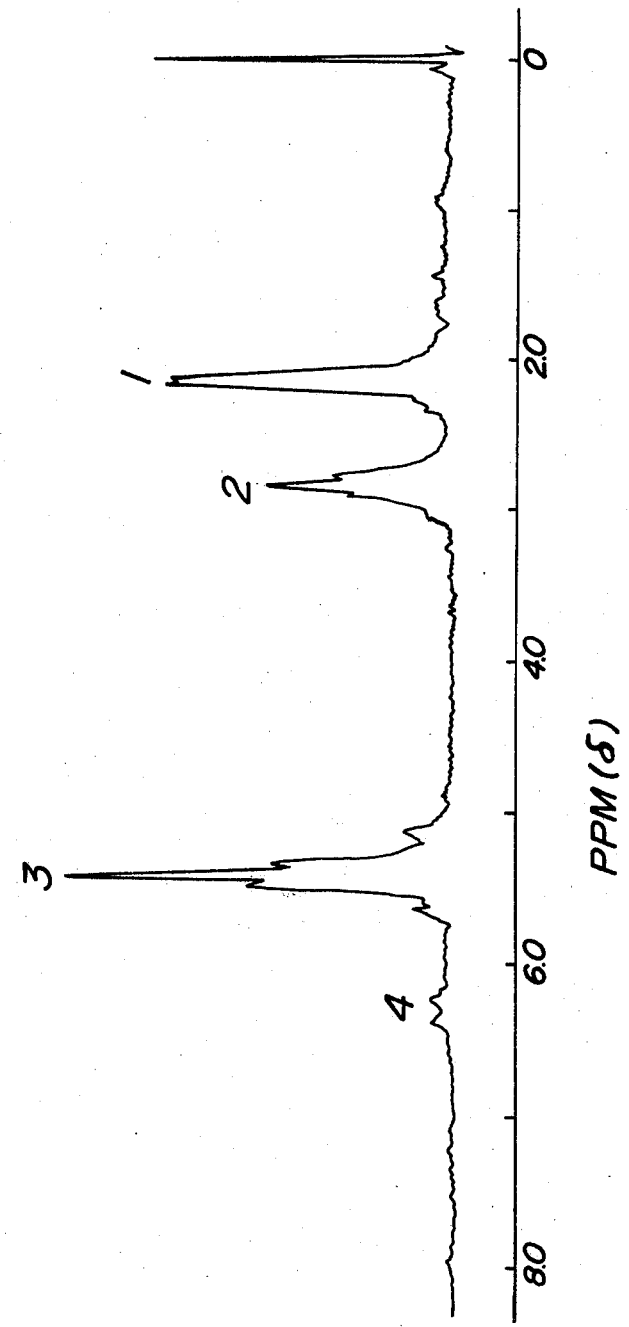

3,886,127

ALKALI METALATED ACETYLENE-CONJUGATED DIENE RANDOM COPOLYMER

BACKGROUND OF THE INVENTION

1. Field of the Invention

The present invention relates to a novel metalated polymer, and more particularly to an alkali metalated acetylene-conjugated diene random copolymer, which has high activity and reactivity that have never been possessed by conventional polymers, and is a useful raw material for the production of coating compositions, adhesives and reactive softeners and other industrial materials.

2. Description of the Prior Art

There have hitherto been known metalated products of conjugated diene polymers, such as polybutadiene and the like. The conventional metalated polybutadiene is produced, for example, by reacting an alkali metal or an organo alkali metal compound with polybutadiene at a high temperature under an inert atmosphere in a solution of the polybutadiene. It is known that the reactivity of alkali metal in metalation decreases in the order of rubidium>potassium>sodium>lithium. When it is intended to produce a lithiated polymer, which is a very useful compound for industry, it is often necessary to carry out the lithiation reaction at a high temperature for a long period of time, and the efficiency in the lithiation is low.

The inventors have found that the acetylene-conjugated diene random copolymer used in the present invention is metalated in an unexpectedly high reaction velocity, and is efficiency in the metalation is remarkably high. For example, the acetylene-butadiene random copolymer can be easily lithiated under a condition, under which polybutadiene is not lithiated at all. Therefore, it is possible to lithiate the acetylene-butadiene random copolymer under a mild condition without causing deterioration and gelation of the copolymer, which would occur under severe conditions of high temperature and long reaction time.

Moreover, the resulting alkali metalated acetylene-conjugated diene random copolymer and the modified polymer are considerably higher than the homopolymer of the conjugated diene in the reactivity with other reactive compounds. This is one of the merits of the present invention.

For example, when a lithiated acetylene-butadiene random copolymer is reacted with carbon dioxide to prepare a modified polymer having carboxyl groups, the modified polymer is easily cured in the presence of oxygen. Therefore the modified polymer is useful as an emulsion type paint and an electrodeposition type paint. However, carboxylated polybutadiene hardly cures under the same curing condition as that in case of the carboxylated acetylene-butadiene random copolymer. Therefore, according to the present invention, various reactive industrial materials can be easily obtained.

The acetylene-conjugated diene random copolymer to be used in the present invention is a novel polymer, the structure of which has never hitherto been known.

Conventional acetylene polymers are black and resinous, and are used in semiconductor, carbon fiber and the like. There was attempted to copolymerize acetylene with butadiene by using a titanium tetrachloride-triethyl-aluminum catalyst, but the resulting product was black, resinous and solvent-insoluble, and was acetylene homopolymer or acetylene-butadiene block copolymer.

The inventors have already found out that acetylene and a conjugated diene are randomly copolymerized in the presence of a novel nickel compound-alkylaluminum halide catalyst to form a transparent random copolymer which is substantially soluble in solvent. The inventors have made further investigations and found out that the copolymer has an unexpectedly high reactivity with alkali metal and further that the resulting alkali metalated copolymer has an unexpectedly high reactivity with various compounds, and accomplished the present invention.

SUMMARY OF THE INVENTION

The present invention relates to an alkali metalated acetylene-conjugated diene random copolymer obtained by reacting an acetylene-conjugated diene random copolymer having an acetylene unit content of 5–60 mol% and a block character P of 0.8–1.2 with an alkali metal or an organo alkali metal compound at a temperature of $-100 \sim +100°C$ under an inert gas atmosphere.

The alkali metalated acetylene-conjugated diene random copolymer of the present invention has a polymer chain metalated at the end and in the stem depending upon the amount of alkali metal or organo alkali metal compound used in the metalation. The efficiency in the metalation of acetylene-conjugated diene random copolymer is considerably higher than that in the metalation of conventional polymers.

When the alkali metalated acetylene-conjugated diene random copolymer of the present invention is reacted with a reagent (A) of oxygen, aldehyde, ketone, epoxide, sulfur, carbon dioxide, carbon disulfude, ester, organic carboxylic acid, acid halide, acid anhydride, organic nitrile, halogen, pyridine, N-halogenoacidimide or isocyanate, a modified polymer, which has hydroxyl groups, thiol groups, carboxyl groups, dithiocarboxylic acid groups, ketone groups, halogen atoms, pyridyl groups, acidimide groups of N-substituted acidamide groups in the stem and/or at the end of polymer chain, can be obtained.

Further, when the alkali metalated copolymer of the present invention is reacted with a reagent (B) of a compound having at least two functional groups of halogen atom, carbonyl group, aldehyde group, carboxylic acid ester group, acid halide group, acid anhydride group, isocyanate group, epoxy group or nitrile group, and a coupling of the copolymer is effected, a polymer having a very high molecular weight can be obtained.

Further, when the alkali metalated copolymer of the present invention is reacted with a reagent (C) of an anionic polymerizable monomer, a graft polymer of the copolymer with the monomer, a block polymer of the copolymer and the monomer, and a polymer cross-linked with the monomer can be obtained.

The above described modified copolymers derived from the alkali metalated acetylene-conjugated diene random copolymer of the present invention have various structures, and they can be directly used as a raw material for the production of cured product, film, paint, etc. and further can be used as a raw material for the production of various industrial materials. Therefore, these modified polymers are very useful for industrial purpose. The alkali metalated acetylene-conjugated diene random copolymer of the present invention is used as a base material of all of these modified polymers.

BRIEF DESCRIPTION OF THE DRAWING

The single FIGURE is one embodiment of the nuclear magnetic resonance spectrum of the acetylene-butadiene random copolymer to be used in the present invention.

DETAILED DESCRIPTION OF THE PREFERRED EMBODIMENT

The conjugated diene, which is one component monomer of the acetylene-conjugated diene random copolymer to be used in the present invention, is a compound having the following general formula $$H_2C=CR^1-CR^2=CH_2$$

wherein $R^1$ and $R^2$ represent hydrogen atoms or hydrocarbon residues having 1-6 carbon atoms. Among the conjugated dienes, butadiene, isoprene and 2,3-dimethylbutadiene are preferable.

The acetylene-conjugated diene random copolymer having an acetylene unit content of 1–70 mol% may be used in the present invention. The random copolymer is entirely different in the property from conjugated diene homopolymer, acetylene homopolymer and acetylene-conjugated diene block copolymer. However, the random copolymer having an acetylene unit content of 5–60 mol% is suitable for the purpose of the present invention. When the acetylene unit content is less than 5 mol% the alkali metalation velocity is lower, and when the content is more than 60 mol%, side reactions occur significantly. Therefore, the random copolymer having an acetylene unit content outside the above described range is not suitable in the present invention.

It is necessary that the copolymer to be used in the present invention is a so-called random copolymer wherein the acetylene unit and the conjugated diene unit are distributed statistically randomly in the polymer chain depending upon the contents of respective units. The block character P, which is used as a measure of randomness of copolymer, is defined as follows in the case of, for example, acetylene-butadiene random copolymer.

The single FIGURE is one embodiment of the nuclear magnetic resonance spectrum of the acetylene-butadiene copolymer to be used in the present invention, which is measured in a deuterochloroform solution at 60 MHz and at room temperature by using tetramethylsilane as an internal standard. In the case when butadiene is bonded in 1,2-type, an absorption due to $=CH_2$ protons of $-CH=CH_2$ appears at 4.80–5.01 δ. However, since this absorption does not substantially appear in the nuclear magnetic resonance spectrum of the copolymer of the present invention, the copolymer has substantially no 1,2-bond, and substantially all of the butadiene units are bonded in 1,4-type. Furthermore, since it has already been confirmed from the infrared absorption spectrum that almost all of the double bonds are present in cis-type in the copolymer, butadiene is copolymerized in cis-type. The nuclear magnetic resonance spectrum of the copolymer has four main absorption, and the absorptions are assigned assined as shown in the following Table.

| Peak No. | δ-Value (ppm) | Assignment |
|---|---|---|
| 1 | 2.12 | $-CH_2-\underline{CH_2}-CH=CH-$ |
| 2 | 2.82 | $-CH=CH-\underline{CH}-_2-CH=CH-$ |
| 3 | 5.40 | $-CH_2-\underline{CH}=\underline{CH}-CH_2-$ |
| 4 | ~6.30 | $-CH_2-\underline{CH}=\underline{CH}-\underline{CH}=\underline{CH}-CH_2-$ |

The peak at 2.12 δ is assigned to methylene protons of butadiene unit of the butadiene-butadiene diad, which are shown by $\underline{H}$ in the following formula.

$$+CH_2-CH=CH-\underline{CH_2}+\underline{CH_2}-CH=CH-CH_2+$$

The peak at 2.82 δ is assigned to methylene protons of butadiene unit of the acetylene-butadiene diad, which are shown by $\underline{H}$ in the following formula:

$$+CH=CH+\underline{CH_2}-CH=CH-CH_2+$$

This peak shows that acetylene and butadiene are copolymerized.

The peak at 5.40 δ is assigned to methine protons of butadiene unit and those of acetylene unit isolated by butadiene units, which are shown by $\underline{H}$ in the following formulae:

$$+CH_2-\underline{CH}=\underline{CH}-CH_2+$$

and $$+CH_2-CH=CH-CH_2+\underline{CH}=\underline{CH}+CH-_2-CH=CH-CH_2+$$

The broad and very low peak at ~6.30 δ is assigned to methine protons of acetylene unit of the acetyleneacetylene diad, which are shown by $\underline{H}$ in the following formula:

$$+CH=CH+CH=CH+$$

Since no peak is observed in a field lower than this peak, it can be seen that three or more acetylene sequence is substantially absent in the copolymer. That is, it can be seen that acetylene is not bonded to form blocks.

The molar fraction of acetylene unit in the copolymer can be calculated from the following formula:

$A = 1 - (R/2)$

In the formula,

A : molar fraction of acetylene unit in the copolymer.

$$R : \frac{(\text{area at } 2.12\delta) + (\text{area at } 2.82\delta)}{(\text{area at } 5.40\delta) + (\text{area at } 6.30\delta)}$$

Then, it can be determined by the diad fractions of monomer unit sequences whether the copolymer is random or block, said diad fractions being calculated from the following formulae:

$$F_{BB} = \frac{B}{1+R'}$$

$F_{AB} = 2R' \cdot F_{BB}$
$F_{AA} = 1 - (F_{AB} + F_{BB})$
In the above formulae, $F_{BB}$: diad fraction of the butadiene-butadiene sequence,
$F_{BB}$: diad fraction of the acetylene-butadiene sequence,
$F_{AA}$: diad fraction of the acetylene-acetylene sequence,
B: molar fraction of butadiene unit in the copolymer (B=1+A), $$R' : \frac{\text{area at } 2.82\delta}{\text{area at } 2.12\delta}$$

The diad fractions of the copolymer of the present invention calculated in this manner were substantially agreed with the following theoretical values when it was assumed that acetylene and butadiene were randomly copolymerized.
$F_{BB} = B^2$
$F_{AB} = 2AB$
$F_{AA} = A^2$
Therefore, it was found that the copolymer of the present invention was a random copolymer of acetylene and butadiene.

Furthermore, the block character P, which is used as one of the measures of the randomness, is shown by the following fomula.

$$P = \frac{F_{AB} \text{ (from experimental value)}}{F_{AB} \text{ (from random assumption)}}$$

P being 1 means random copolymer,
P being << 1 means block copolymer, and
P being >> 1 means alternating copolymer.

In the present invention, random copolymers having a block character P of 0.8–1.2, particularly 0.9–1.1, are preferably used. The more a random copolymer resembles a block copolymer in the structure, the lower the reactivity of the random copolymer in the alkali metalation is, and further the resulting metalated copolymer becomes heterogeneous.

The alkali metalation reagent to be used in the presnt invention is alkali metal or organo alkali metal compound.

The alkali metal includes lithium, sodium, potassium, rubidium and cesium metals.

The organo alkali metal compound is one represented by the following general formula
$RM_n$
wherein R represents a hydrocarbon residue having 1–20 carbon atoms, M represents lithium, sodium, potassium, rubidium or cesium, and n is an integer of 1—4. The compound includes (1) organo mono-alkali metal compound having one alkali metal in the molecule, (2) organo poly-alkali metal compound having two, three or four alkali metals in the molecule, and (3) alkali metalated organic compound.

The organo mono-alkali metal compound having one alkali metal in the molecule (1) is represented by the following general formula RM, wherein R represents a hydrocarbon residue selected from the group consisting of alkyl groups, such as methyl, ethyl, propyl, butyl, amyl and hexyl groups, etc; alkenyl groups, such as allyl and methallyl groups, etc.; aryl, alkaryl and aralkyl groups, such as phenyl, xylyl, naphthyl and phenylisopropyl groups, etc.; and M represents lithium, sodium, potassium, rubidium or cesium.

As the compound (1), mention may be made of, for example, methyllithium, ethyllithium, propyllithium, butyllithium, amyllithium, hexyllithium, allyllithium, methallyllithium, phenyllithium, tolyllithium, xylyllithium, lithiumnaphthalene, lithiumanthracene and phenylisopropyllithium, and sodium, potassium, rubidium and cesium compounds corresponding to these lithium compounds.

As the organo poly-alkali metal compound having 2–4 alkali metals in the molecule (2), mention may be made of for example, 1,4-dilithiobutane, 1,6-dilithiohexane, 1,10-dilithiodecane, 1,20-dilithioeicosane, 1,4-dilithio-2-butene, dilithionaphthalene, 4,4'-dilithiobiphenyl, dilithioanthracene, 1,2-dilithio-1,1-diphenylethane, 1,2-dilithio-1,2-dipheneylethane, 1,2-dilithiotetraphenylethane, 1,2-dilithio-1-phenyl-1-naphthylethane, 1,2-dilithio-1,2-dinaphthylethane, 1,2-dilithiotrinaphthylethane, 1,4-dilithiocyclohexane, 1,3,5-trilithiocyclohexane, 1-lithio-4-(2-lithiomethylphenyl)butane, 1,2-di(lithiobutyl)benzene, 1,3-dilithio-4-ethylbenzene, 1,5,12-trilithiododecane, 1,4-di(1,2-dilithio-2-phenylethyl)benzene, 1,5-dilithio-3-pentene, dilithiophenanthrene, 1,2-dilithiotriphenylethane, dilithiomethane, 1,4-dilithio-1,1,4,4-tetraphenylbutane and 1,4-dilithio-1,4-diphenyl-1,4-dinaphthylbutane, and sodium, potassium, rubidium and cesium compounds corresponding to these lithium compounds.

As the alkali metalated organic compound (3), mention may be made of, for example, alkali metalated compounds of olefinic compounds, such as α-methylstyrene, styrene, isoprene and dimethylbutadiene; and alkali metalated compounds of polycyclic aromatic compounds, such as naphthalene, phenanthrene, anthracene and biphenyl.

In the present invention, the alkali metal and organo alkali metal compound are used in an amount of 0.001–100 times, preferably 0.005–1.0 time, calculated as alkali metal atom, based on the total amount of acetylene and conjugated diene units in the acetylene-conjugated diene random copolymer.

The alkali metalation reaction of the acetyleneconjugated diene random copolymer is carried out by reacting the copolymer with at least one of alkali metals and organo alkali metal compounds in a proper solvent.

As the solvent, use is made of, for example, aliphatic hydrocarbons, such as hexane, heptane, pentane, petroleum ether, etc.; aromatic hydrocarbons, such as benzene, toluene, xylene, ethylbenzene, etc.; alicyclic hydrocarbons, such as cyclohexane, methylcyclopentane, ethylcyclohexane, etc.; ethers, such as, ethyl ether, dioxane, tetrahydrofuran, dimethoxyethane, anisole, etc.

The solvent is used in an amount of 10–5,000% by weight, preferably 300–3,000% by weight, based on the weight of acetylene-conjugated diene random copolymer.

When the alkali metalation reaction is effected in a hydrocarbon solvent, if a polar organic compound is added to the reaction system, the alkali metalation reaction is promoted.

The polar organic compound includes tertiary amines, such as triethylamine, tributylamine, dimethylaniline, tetramethylethylenediamine, tetrahydropyrane, N-methylpiperazine, etc.; ethers, such as methyl ether, ethyl ether, propyl ether, butyl ether, amyl ether, dimethoxyethane, tetrahydrofuran, anisole, phenyl ether, dioxane, etc.; thioethers, such as methyl sulfide, ethyl sulfide, butyl sulfide, phenyl sulfide, tetrahydrothiophene, thioanisole, etc. The amount of these polar promoters should be selected depending the reaction velocity in the alkali metalation of the copolymer.

The alkali metalation reaction of the present invention is carried out at a temperature of $-150 \sim +150°C$, preferably $-100 \sim +100°C$, most preferaly $0 \sim +90°C$.

The alkali metalation reaction is carried out under inert gas atmospheres, such as nitrogen, argon, helium, etc. The reaction should be carried dout in the absence of water, oxygen, etc., which react with the alkali metal and organo alkali metal compound.

The alkali metalated acetylene-conjugated diene random copolymer obtained in the above described method has alkali metals in the stem and/or at the end of the polymer chain depending upon the metalation condition. The alkali metalated copolymer can be formed into various modified polymers by reacting the copolymer with the above described reagents (A), (B) and (C).

An explanation will be made with respect to the production of the modified polymer hereinafter.

When the alkali metalated acetylene-conjugated diene random copolymer of the present invention is reacted with the reagent (A) of oxygen, aldehyde, ketone, epoxide, sulfur, carbon dioxide, carbon disulfude, ester, organic carboxylic acid, acid halide, acid anhydride, organic nitrile, halogen, pyridine, N-halogenoacidimide or isocyanate, a modified polymer, which has hydroxyl groups, thiol groups, carboxyl groups, dithiocarboxylic acid groups, ketone groups, halogen atoms, pyridyl groups, acidimide groups or N-substituted acidamide groups in the stem and/or at the end of polymer chain can be obtained.

As the reagent (A), mention may be made of oxygen; aliphatic saturated aldehydes, such as formaldehyde, acetaldehyde, propionaldehyde, butyraldehyde, isobutyraldehyde, valeraldehyde, isovaleraldehyde, pivalic aldehyde, capronaldehyde, heptaldehyde, caprylaldehyde, pelargonaldehyde, capric aldehyde, undecyl aldehyde, lauric aldehyde, tridecyl aldehyde, myristaldehyde, pentadecyl aldehyde, palmitic aldehyde, margaric aldehyde, stearic aldehyde, etc.; aliphatic unsaturated aldehydes, such as acrolein, crotonaldehyde, propionaldehyde, etc.; aromatic aldehydes, such as benzaldehyde, o-tolualdehyde, m-tollualdehyde, p-tolualdehyde, salicylaldehyde, cinnamaldehyde, $\alpha$-naphthaldehyde, $\beta$-naphthaldehyde, etc.; heterocyclic aldehydes, such as furfural, etc.; aliphatic saturated ketones, such as acetone, methyl ethyl ketone, methyl propyl ketone, methyl isopropyl ketone, methyl butyl ketone, methyl isobutyl ketone, pinacolone, diethyl ketone (propione), butyrone, diisopropyl ketone, etc.; aliphatic unsaturated ketones, such as methyl vinyl ketone, mesityl oxide, methylheptenone, etc.; alicyclic ketones, such as cyclobutanone, cyclopentanone, cyclohexanone, etc.; aromatic ketones, such as acetophenone, propiophenone, butyrophenone, valerophenone, benzophenone, dibenzyl ketone, 2-acetonaphthone, etc.; heterocyclic ketones, such as acetothienone, 2-acetofuron, etc.; epoxides, such as ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 1,2-epoxy-3-butene, etc.; sulfur; carbon dioxide; carbon disulfide; organic carboxylic acids, such as formic acid, acetic acid, propionic acid, butyric acid, isobutyric acid, valeric acid, isovaleric acid, benzoic acid, cinnamic acid, acrylic acid, anthranilic acid, etc.; esters, such as methyl, ethyl, propyl, isopropyl, butyl, isobutyl, n-amyl and isoamyl esters of these carboxylic acids, etc.; acid halides, such as chloride, bromide, iodide of the above described carboxylic acids, etc.; acid anhydrides, such as acetic anhydride, propionic anhydride, benzoic anhydride, etc.; aliphatic nitriles, such as acetonitrile, propionitrile, butyronitrile, valeronitrile, capronitrile, enanthonitrile, caprylonitrile, pelargonnitrile, caprinitrile, lauronitrile, palmitonitrile, stearonitrile, acrylonitrile, crotononitrile, etc.; aromatic nitriles, such as benzonitrile, tolunitrile, benzyl cyanide, cinnamonitrile, naphthonitrile, etc.; heterocyclic nitriles, such as cyanopyridiene, etc.; halogens, such as chlorine, bromine, iodine, etc.; pyridine; N-halogeno-acidimides, such as N-chlorosuccinimide, N-chloroglutarimide, N-chlorophthalimide, N-bromosuccinimide, N-bromoglutarimide, N-bromophthalimide, etc.; and isocyanates, such as methyl, ethyl, isopropyl, isobutyl, phenyl, tolyl, $\alpha$-naphthyl, $\beta$-naphthyl and vinyl isocyanates, etc. The modified polymers having the above described functional groups have an activity inherent to the functional group and are useful as a raw material for the production of various cured products, molded articles and other industrial materials.

When the alkali metalated copolymer is mixed with the reagent (B) of a compound having at least two functional groups of halogen atom, carbonyl group, aldehyde group, carboxylic acid ester group, acid halide group, acid anhydride group, isocyanate group, epoxy group or nitrile group, and a coupling of the copolymer is effected, a polymer having a very high molecular weight can be obtained.

As the reagent (B), mention may be made of polyhalogenated compounds, such as methylene bromide, ethylene bromide, trimethylene bromide, 1,4-dibromobutane, p-xylene chloride, chloromethyl ether, phosgene, dichloromethyltrimethylsilane, bis(chloromethyl)dimethylsilane, tri(chloromethyl)methylsilane, $\beta,\beta$-dichloroethyltriethylsilane, dimethyldichlorosilane, methyltrichlorosilane, diphenyldichlorosilane, phenyltrichlorosilane, silicon tetrachloride, etc., polyketones, such as diketene, acetylacetone, etc.; ketoaldehydes, such as methylglyoxal, acetoacetaldehyde, levulinaldehyde, phenylglyoxal, etc.; ketoacid esters, such as methyl, ethyl, propyl, isopropyl, butyl, isobutyl, n-amyl and isoamyl esters of pyrubic acid, benzoylformic acid, phenylpyruvic acid, acetoacetic acid, propionylacetic acid, benzoylacetic acid, levulic acid, $\beta$-benzoylpropionic acid and other ketoacids, etc.; polyaldehydes, such as glyoxal, succindialdehyde, adipic dialdehyde, glutaraldehyde, phthalaldehyde, etc.; methyl, ethyl, propyl, isopropyl, butyl, isobutyl, n-amyl and isoamyl esters of adipic acid, phthalic acid, glutaric acid, malonic acid, succinic acid, malelric acid, oxalic acid, trimellitic acid, pyromellitic acid, cyclopentanetetracarboxylic acid, and other polycarboxylic acids; polyester resins; halogenides of polybasic acid, such as oxalyl chloride, succinyl chloride, etc.; cyclic acid anhydrides, such as succinic anhydride,, maleic anhydride, glutaric anhydride, phthalic anhydride, pyromellitic anhydride, cyclopentanetetracarboxylic acid anhydride, benzophenonecarboxylic acid anhydride, trimellitic anhydride chloride, etc.; polyisocyanates, such as 2,4-tolylene diissocyanate, 2,6-tolylene diisocyanate, 1,4-tetramethylene diisocyanate, 1,6-hexamethylene diisocyanate, 1,10-decamethylene diisocyanate, 1,5-naphthalene diisocyanate, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanatediphenyl ether, 5,6'-dimethyl-1,3-phenylene diisocyanate, 2,4-dimethyl-1,3-phenylene diisocyanate, 4,4'-diisocyanatediphenyl ether, benzidine diisocyanate, 4,6-dimethyl-1,3-phenylene diisocyanate, 9,10-anthracene diisocyanate, 4,4'-diisocyanatedibenzyl, 3,3'-dimethyl-4,4'-diisocyanatediphenylmethane, 2,6-dimethyl-4,4'-diisocyanatediphenyl, 2,4-diisocyanatestilbene, 3,3'-dimethyl-4,4'-diisocyanatediphenyl, 3,3'-dimethoxy-4,4'-diisocyanatediphenyl, 1,4-anthracene diisocyanate, 2,5-fluorene diisocyanate, 1,8-naphthalene diisocyanate, 1,3-phenylene diisocyanate, methylene-bis(4-phenyl isocyanate), 2,6-diisocyanatebenzofuran, 2,4,6-toluene triisocyanate, 2,4,4'-triisocyanatediphenyl ether, etc.; polyepoxides, such as ethylene glycol bis-trimellitate, butadiene oxide, dimethylpentane dioxide, diglycidyl ether, vinylcyclohexene dioxide, limonene dioxide, divinylbenzene dioxide, resorcindiglycidyl ether, 2-glycidylphenylglycidyl ether, 2,6-diglycidylphenylglycidyl ether, 3,4-epoxy-6-methylcyclohexylmethyl-3,4-epoxymethylcyclohexane carboxylate, etc.; epoxy resins, such as bisphenol A-epichlorohydrin condensate, etc.; polynitriles, such as malononitrile, succinonitrile, glutaronitrile, adiponitrile, fumaronitrile, maleonitrile, phthalonitrile, etc.

When the reagent (B) is added to a system containing alkali metalated acetylene-conjugated diene random copolymer a coupling reaction of the copolymer through the reagent (B) occurs, and a modified polymer having a high molecular weight formed. The modified polymer can be used as a raw material for the production of various cured products and molded articles.

Further, when the alkali metalated copolymer of the present invention is reacted with the reagent (C) of an anionic polymerizable monomer, a graft polymer, a block polymer or a crosslinked polymer can be obtained.

As the reagent (C), mention may be made of, for example, vinyl-substituted aromatic hydrocarbons, such as styrene, α-methylstyrene, α-butylstyrene, α-phenylstyrene, p-methylstyrene, p-i-propylstyrene, p-t-butylstyrene, divinylbenzene, etc.; vinyl-substituted heterocyclic compounds, such as 2-vinylpyridine, 4-vinylpyridine, etc.; conjugated dienes, such as butadiene, isoprene, pentadiene-1,3, hexadiene-1,3, dimethylbutadiene, etc.; acrylonitrile; methacrylonitrile; acrylic acid esters, such as methyl acrylate, ethyl acrylate, isopropyl acrylate, n-butyl acrylate, t-butyl acrylate, n-amyl acrylate, n-octyl acrylate, vinyl acrylate, allyl acrylate, phenyl acrylate, benzyl acrylate, cyclohexyl acrylate, etc.; methacrylic acid esters, such as methyl methacrylate, ethyl methacrylate, n-propyl methacrylate, i-propyl methacrylate, i-butyl methacrylate, n-butyl methacrylate, s-butyl methacrylate, t-butyl methacrylate, phenyl methacrylate, benzyl methacrylate, cyclohexyl methacrylate, menthyl methacrylate, trityl methacrylate, etc.

The graft type, block type and crosslinked type modified polymers obtained by the use of the reagent (C) have various properties inherent to the used reagents, and these modified polymers are useful raw materials for the production of cured products, molded articles, sealing compositions and coating compositions.

The reaction of the alkali metalated acetylene-conjugated diene random copolymer with the above described reagent (A), (B) or (C) is usually carried out at a temperature of $-150 \sim +200°C$.

The reagent (A) is usually used in an amount of 0.5–2.0 moles based on 1.0 equivalent of the active metal atom in the alkali metalated acetylene-conjugated diene random copolymer.

The reagent (B) is used in an amount of 0.001–1.0 mole and the reagent (C) is used in an amount of 0.5–1,000 moles, based on 1.0 equivalent of the active metal atom in the copolymer. Of course, the reagents, (A), (B) and (C) may be used in the amounts outside the above molar ratios.

These modification reactions are usually carried out following to the alkali metalation reaction of an acetylene-conjugated diene random copolymer in the same reaction system, but may be caried out in a separate reaction system. That is, the modification reaction may be carried out in a solvent different from that used in the alkali metalation reaction, or may be carried out after the solvent has been removed. Filtration and other procedures may be carried out between the metalation reaction and the modification reaction. The modification reaction may be carried out in the presence of the above described promoter. The modification reaction is usually carried out under an inert atmosphere, and it is necessary to take care that active materials other than the reagent (A), (B) or (C) do not enter the reaction system. When the modified polymer obtained in the present invention is used as an intermediate for the production of another raw material, the reaction mass containing the modified polymer may be directly used in the reaction for the production of the raw material or may be used after the modification reaction is stopped by adding water, methanol, etc. to the modification reaction system. A small amount of antioxidant commonly used for rubber and plastic may be added to the modified polymer.

The following examples are given for the purpose of illustration of this invention and are not intended as limitations thereof.

EXAMPLE 1

A random copolymer of acetylene and butadiene was synthesized in the following manner. Into a glass reaction vessel of 1 l capacity, the interior of which was previously purged with nitrogen, were charged 350 ml of toluene and 15 mmoles of nickel naphthenate (in the form of a 0.5 mol/l hexane solution). The catalyst solution was kept at 30°C, added with 75 mmoles of diethylaluminum chloride (in the form of a 2 mol/l hexane solution) and further kept at 30°C for 10 minutes under stirring to age the catalyst. A gaseous mixture of acetylene (0.20 mol/hr) and butadiene (0.82 mol/hr) was introduced into the catalyst solution at 30°C for 4 hours to effect a polymerization reaction of the acetylene and butadiene. After the reaction, the reaction mass was poured into methanol to precipitate the reaction product. From the reaction product, 60 g of a chloroform-soluble copolymer was obtained.

The infrared absorption spectrum of the resulting copolymer was measured in a carbon disulfide solution, and the microstructure of the double bond of the copolymer was determined according to the Morero method [D. Moero et al, Chim. e. Ind., 41, 758 (1959)]. As a result, it was found that the microstructure of the double bond of the copolymer was composed of 85% of cis-type bond, 10% of trans-type bond and 5% of vinyl-type bond. The copolymer had an intrinsic viscosity [$\eta$] of 0.1 in toluene at 30°C.

The composition and randomness of the copolymer were analyzed in the following manner by the nuclear magnetic resonance spectrum. The copolymer was dissolved in deuterochloroform, and its nuclear magnetic resonance spectrum was measured at 60 MHz by using tetramethylsilane as an internal standard at room temperature. The nuclear magnetic resonance spectrum of the copolymer had four main peaks, which were assigned as follows.

The peak at 2.12 $\delta$ is assigned to methylene protons of butadiene unit of the butadiene-butadiene diad.

The peak at 2.82 $\delta$ is assigned to methylene protons of butadiene unit of the acetylene-butadiene diad.

The peak at 5.40 $\delta$ is assigned to methine protons of butadiene unit and those of acetylene unit isolated by butadiene units.

The broad and very low peak at $\delta 6.30$ $\delta$ is assigned to methine protons of acetylene unit of the acetyleneacetylenne diad.

The peak at 2.82 $\delta$ indicates the presence of diallyl type active methylene structure, and the peak at ~6.30 $\delta$ indicates the presence of conjugated diene type structure.

The molar fraction of acetylene unit is the copolymer can be calculated from the following formula.

$A = 1 - (R/2)$

In the formula,

A : molar fraction of acetylene unit in the copolymer $$R : \frac{(\text{area at } 2.12\delta) + (\text{area at } 2.82\delta)}{(\text{area at } 5.40\delta) + (\text{area at } 6.30\delta)}$$

From the measured value, A was calculated to be 0.240. That is, the acetylene unit content of the copolymer was 24.0 mol%.

Then it can be determined by the diad fractions of monomer unit sequences whether the copolymer is random or block, said diad fractions being calculated from the following formulae.

$$F_{BB} = \frac{B}{1+R'}$$

$F_{AB} = 2R' \cdot F_{BB}$
$F_{AA} = 1 - (F_{AB} + F_{BB})$

In the above formulae, $F_{BB}$: diad fraction of the butadiene-butadiene sequence, $F_{AB}$: diad fraction of the acetylene-butadiene sequence, $F_{AA}$: diad fraction of the acetylene-acetylene sequence, B: molar fraction of butadiene unit in the copolymer ($B = 1 - A$), $$R' : \frac{\text{area at } 2.82\delta}{\text{area at } 2.12\delta}$$

The diad fractions of the copolymer calculated in this manner from the measured values were as follows.

$F_{BB} = 0.57$
$F_{AB} = 0.39$
$F_{AA} = 0.04$

While, if it is assumed that acetylene and butadiene are randomly copolymerized, the theoretical values of the diad fractions are as follows.

$F_{BB} = B^2 = 0.58$
$F_{AB} = 2AB = 0.36$
$F_{AA} = A^2 = 0.06$

Therefore, the measured values and the theoretical values of the diad were wee agreed with each other very well, and it was found that the copolymer synthesized in this Example 1 has a random copolymer of acetylene and butadiene.

Further, in the copolymer, the above defined block character P was calculated as follows.

$$P = \frac{F_{AB} \text{ (from experimental value)}}{F_{AB} \text{ (from random assumption)}} = \frac{0.39}{0.36} = 1.08$$

Therefore, the copolymer was clearly a random copolymer.

A lithiation reaction of the copolymer was effected in the following manner. This reaction was wholly effected under nitrogen atmosphere. Into a flask was charged 1.21 g of the copolymer, and dissolved in 50.8 ml of dimethoxyethane. Then, 0.88 g of fine chips of lithium metal was added to the copolymer solution and a lithiation reaction was effected at 82°C for 24 hours under electromagnetic stirring. The amount of lithium bonded to carbon atom (C-Li bond) was determined according to a double titration method by H. Gilman et al [J. Organometal Chem., 2, 447 (1964)]. It was found that 9.8% of monomer units (total amount of acetylene and butadiene units) was lithiated. While, polybutadiene is not substantially lithiated under the above described condition as shown in the following Comparative Example 1. Therefore, it is considered that, in the acetylenebutadiene random copolymer, the diallyl type methylene protons resulted from the acetylene-butadiene sequence are probably-lithiated. That is, 24.7% of the diallyl type active methylene protons was lithiated in the copolymer.

COMPARATIVE EXAMPLE 1

Polybutadiene having an intrinsic viscosity [$\eta$] of 0.15 in toluene at 30°C and a microstructure composed of 81.2% of cis-1,4 bond, 15.9% of trans-1, 4 bond and 2.9% of 1,2-bond was subjected to a lithiation reaction under the same condition as described in Example 1. However, the polybutadiene was not substantially lithiated.

EXAMPLE 2

Into a flask was charged 1.18 g of the acetylenebutadiene random copolymer synthesized in Example 1, and dissolved in 75.1 ml of toluene. Then, 24.9 mmoles of butyllithium (1 mol/l hexane solution) was adsded to the copolymer solution, and a lithiation reaction was effected at 40°C for 3 horus under nitrogen atmosphere.

The resulting lithiated copolymer was subjected to a carboxylation reaction in the following manner. The flask containing the lithiated copolymer was cold with ice and the lithiated copolymer was poured on a dry ice-tetrahydrofuran slurry. The slurry was acidified with oxalic acid, and then poured into a large amount of methanol to precipitate the carboxylated copolymer. After the copolymer was dried, the carboxyl group content of the copolymer was determined by titrating with alcoholic potash in pyridine by using phenolphthalein as an indicator. It was found that 1.1% of monomer units of the copolymer was carboxylated. This amount corresponds to 2.8% of diallyl type active methylene protons.

COMPARATIVE EXAMPLE 2

The same polybutadiene as used in Comparative Example 1 was subjected to a lithiation reaction and a carboxylation in the same manner as described in Example 2. However, it was found that no carboxyl group was introduced into the polybutadiene. This shows that polybutadiene was not lithiated.

EXAMPLE 3

Into a flask was charged 1.88 g of the acetylenebutadiene random copolymer synthesized in Example 1, and dissolved in 87.5 ml of heptane. Then, 24.9 mmoles of butyllithium (2 mol/l hexane solution) and 24.9 mmoles of tetramethylethylenediamine were added to the copolymer solution, and a lithiation reaction was effected at 80°C for 1 hour under nitrogen atmosphere. The lithiated copolymer was carboxylated in the same manner as described in Example 2, and the carboxyl group content of the copolymer was analyzed. It was found that 23.0% of monomer units of the copolymer was carboxylated.

EXAMPLE 4

Into a flask was charged 1.88 g of the acetylenebutadiene random copolymer synthesized in Example 1, and dissolved in 87.5 ml of tetrahydrofuran. Then, 24.9 mmoles of butyllithium (2 mol/l hexane solution) was added to the copolymer solution, nad a lithiation reaction was effected at 40°C for 3 hours under nitrogen atmosphere. After the reaction, the lithiated copolymer was carboxylated in the same manner as described in Example 2, and the carboxyl group content of the copolymer was analyzed. It was found that 11.5% of monomer units of the copolymer was carboxylated. While, polybutadiene is not substantialaly lithiataed under the above described condition as shown in the following Comparative Example 3. added it is considered that, in the acetylene-butadiene random copolymer, the diallyl type methylene protons resulted from the acetylene-butadiene sequence hours probably carobyxlate. That is, 29.5% of the diallyl type active methylene protons was carboxylated in the copolymer.

COMPARATIVE EXAMPLE 3

The same polybutadiene as used in Comparative Example 1 was subjected to a lithiation reaction and a carboxylation reaction in the same manner as described in Example 4. However, it was found that no carboxyl group was introduced into the polybutadiene. This shows that polybutadiene was not lithiated.

EXAMPLE 5

Into a flask was charged 5.03 g of the acetylenebutadiene random copolymer synthesized in Example 1, and dissolved in 106.1 ml of dimethoxyethane. Then, 6.27 g of fine chips of lithium metal was added to the copolymer solution, and a lithiation reaction was effected at 82°C for 24 hours under nitrogen atmosphere. It was found that 2.2% of monomer units (total amount of acetylene and butadiene units) was lithiated.

A pressure bottle, the interior of which was previously purged with nitrogen, were charged with 21 ml the above obtained lithiated copolymer solution (corresponds to 1 g of the acetylene-butadiene) copolymer), 20 ml of benzene and 1.13 g of styrene monomer. After the bottle was sealed, a graft polymerization reaction of the styrene was effected at 0°C for 16 hours. After the reaction, the reaction mass was precipitated in a large amount of methanol to obtain a graft polymer. The yield was 1.29 g. This shows that 0.29 g of the styrene is grafted to the acetylene-butadiene random copolymer. It was also found from the infrared absorption spectrum that styrene was grafted to the acetylene-butadiene copolymer.

EXAMPLE 6

A lithiated aceetylene-butadiene random copolymer synthesized in the exactly same manner as described in Example 1 was subjected to a coupling reaction. That is, after the lithiation reaction, lithiulm metal was removed by filtration, and then 1.25 mmoles of 1,4-dibromobutane was added to the lithiated copolymer solution, and the coupling reaction was effected at room temperature for 24 hours. The reaction mass was precipitated in a large amount of methanol, and the precipitate was filtered and dried. The resulting product was a solvent-insoluble gel. It was found that the lithiated copolymer was formed into a polymer having a very high molecular weight.

EXAMPLE 7

A random copolymer of acetylene and isoprene was synthesized in the following manner. Into a glass reaction vessel of 300 ml capacity, the interior of which was previously purged with nitrogen, were charged 70 ml of toluene, 3 mmoles of nickel naphthenate (in the form of a 0.5 mol/l hexane solution) and 15 mmoles of diethylaluminum chloride (in the form of a 2 mol/l hexane solution) in this order. The catalyst was aged at 30°C for 10 minutes. After 0.39 mole of liquid isoprene was added to the catalyst solution, acetylene was introduced into the reaction solution at a constant rate at 30°C for 3 hours so that the total amount of the acetylene was 0.12 mole, whereby a copolymerization reaction of the acetylene and isoprene was effected. The reaction mass was precipitated in methanol to obtain a reaction product. From the reaction product, 9.5 g of a chloroform-soluble copolymer was obtained. The copolymer had an intrinsic viscosity of 0.1 at 30°C in toluene. It was ascertained from the nuclear magnetic resonance spectrum of the copolymer that the copolymer contained 43.9 mol% of acetylene units, and the acetylene and the isoprene are randomly copolymerized in the copolymer.

Then, 1.23 g of the above obtained acetyleneisoprene random copolymer was lithiated in the same manner as described in Example 5, and the lithiated copolymer was grafted with styrene.

Analysis of the lithiated copolymer showed that 3.2% of monomer units of the acetylene-isoprene random copolymer was lithiataed. Further, it was found that 0.30 g, based on 1 g of the acetylene-isoprene random copolymer, of styrene was grafted to the copolymer in the graft reaction of the styrene.

EXAMPLE 8

Into a flash was charged 2.00 g of an acetylenebutadiene random copolymer having an acetylene unit content of 16.3 mol%, and dissolved in 100 ml of tetrahydrofuran. Then, 4.00 g of fine chips of sodium metal were added to the copolymer solution, and a metalation reaction was effected at 66°C for 5 hours under nitrogen atmosphere with stirring. In this reaction, sodium was added to 4.0% of monomer units (total amount of acetylene and butadiene units) of the copolymer. Into a pressure bottle, the interior of which had previously been purged with nitrogen, 30 ml of the sodium-added copolymer solution (corresponds to 0.60 g of the copolymer) was charged, and then 6.81 g of isoprene monomer was added thereto. The bottle was sealed, and a graft polymerization of the isoprene to the copolymer was effected at 0°C for 2 hours. After the polymerization reaction, the reaction product was precipitated in a large amount of methanol to obtain a graft polymer. It was found that 4.51 g of isoprene was grafted to the acetylene-butadiene random copolymer.

What is claimed is:

1. An alkali metalated acetylene-conjugated diene random copolymer obtained by reacting an acetylene-conjugated diene random copolymer having an acetylene unit content of 5–60 mol% and a block character $P$ of 0.8–1.2 with an alkali metal or an alkali metal hydrocarbon compound in a solvent at a temperature of $-100 \sim +100°C$ under an inert gas atmosphere.

2. A copolymer according to claim 1, wherein said alkali metal is lithium, sodium or potassium.

3. A copolymer according to claim 1, wherein said alkali metal is lithium or sodium.

4. A copolymer according to claim 1, wherein said alkali metal hydrocarbon compound has the following general formula:

$RM_n$ wherein $R$ represents a hydrocarbon residue having 1–20 carbon atoms; $M$ represents a lithium, sodium, potassium, rubidium or cesium atom and $n$ is an integer of 1–4.

5. A copolymer according to claim 1, wherein said alkali metal hydrocarbon compound has the following general formula:

$RM$ wherein $R$ represents an alkyl group having 1–6 carbon atoms and $M$ is a lithium, sodium or potassium atom.

6. A copolymer according to claim 1, wherein said alkali metal hydrocarbon compound is butyllithium.

7. A copolymer according to claim 1, wherein said acetylene-conjugated diene random copolymer is acetylene-butadiene random copolymer or acetylene-isoprene random copolymer.

8. A copolymer according to claim 1, wherein said alkali metalation reaction is carried out in a solvent selected from the group consisting of aliphatic hydrocarbons, aromatic hydrocarbons, alicyclic hydrocarbons and ethers.

9. A copolymer according to claim 1, wherein said metalation reaction is carried out at a temperature of $0 \sim +90°C$.

10. A copolymer according to claim 1, wherein said alkali metal or organo alkali metal compound is used in an amount of 0.005–1.0 time, calculated as the alkali metal atom, of the total amount of acetylene and conjugated diene units in the copolymer.

* * * * *